United States Patent
Suumäki et al.

(10) Patent No.: US 7,260,080 B2
(45) Date of Patent: Aug. 21, 2007

(54) CONFIGURING COMPRESSION IN PACKET-SWITCHED DATA TRANSMISSON

(75) Inventors: Jan Suumäki, Tampere (FI); Ari Tourunen, Espoo (FI)

(73) Assignee: Nokia Corporation, Espoo (FI)

( * ) Notice: Subject to any disclaimer, the term of this patent is extended or adjusted under 35 U.S.C. 154(b) by 894 days.

(21) Appl. No.: 10/027,839

(22) Filed: Dec. 19, 2001

(65) Prior Publication Data

US 2002/0089993 A1    Jul. 11, 2002

(30) Foreign Application Priority Data

Dec. 29, 2000    (FI)    ................................. 20002890

(51) Int. Cl.
     *H04B 7/216*    (2006.01)
     *H04H 7/24*    (2006.01)
     *H04Q 7/28*    (2006.01)
     *H04L 12/66*    (2006.01)

(52) U.S. Cl. ................. 370/342; 370/395.65; 370/341; 370/354; 370/338; 375/240

(58) Field of Classification Search ................ 370/477, 370/521, 352–356, 338–466; 375/240
See application file for complete search history.

(56) References Cited

U.S. PATENT DOCUMENTS

| | | | |
|---|---|---|---|
| 5,987,022 A | 11/1999 | Geiger et al. | ................ 370/349 |
| 6,041,295 A | 3/2000 | Hinderks | .................... 704/206 |
| 6,134,434 A | 10/2000 | Krishnamurthi et al. | .... 455/419 |
| 6,332,199 B1 | 12/2001 | Meth et al. | .................... 714/13 |
| 6,434,133 B1 * | 8/2002 | Hamalainen | ................ 370/338 |

(Continued)

FOREIGN PATENT DOCUMENTS

EP    1122925 A1    8/2001

(Continued)

OTHER PUBLICATIONS

"Broadband radio access for IP-based network (BRAIN)—a key enabler for mobile internet access" Wisely D. et al., Personal, Indoor and Mobile Radio Communications, 2000. PIMRC 2000, vol. 1, Sep. 2000, pp. 431-436.

(Continued)

*Primary Examiner*—Wing Chan
*Assistant Examiner*—Venkatesh Haliyur
(74) *Attorney, Agent, or Firm*—Perman & Green, LLP

(57) ABSTRACT

A method of configuring a compression method for a terminal in a mobile system. The mobile system comprises a terminal for which characteristics parameters are specified comprising at least the compression methods supported by the terminal, and a radio network, in which a functional entity is configured for specifying a compression method to a radio bearer. The use of a compression method on the radio bearers of the terminal is specified on the basis of the characteristics parameters transmitted by the terminal. The user of the terminal updates the parameters specifying the compression methods of the terminal, the characteristics parameters of the terminal being modified in the terminal in accordance with this update, and the modified characteristics parameters are transmitted to a function comprised by the radio network. The modified characteristics parameters are used to configure the use of a compression method for each simultaneous radio bearer of the terminal.

7 Claims, 3 Drawing Sheets

U.S. PATENT DOCUMENTS

| | | | |
|---|---|---|---|
| 6,542,504 B1 * | 4/2003 | Mahler et al. | 370/392 |
| 6,590,905 B1 * | 7/2003 | Suumaki et al. | 370/466 |
| 6,690,679 B1 * | 2/2004 | Turunen et al. | 370/469 |
| 6,839,339 B1 * | 1/2005 | Chuah | 370/349 |
| 2002/0001315 A1 | 1/2002 | Tran et al. | 370/475 |
| 2002/0057715 A1 * | 5/2002 | Hannu et al. | 370/477 |
| 2002/0064164 A1 * | 5/2002 | Barany et al. | 370/401 |

FOREIGN PATENT DOCUMENTS

| | | |
|---|---|---|
| WO | WO 00/41426 | 7/2000 |
| WO | WO 01/93468 A1 | 12/2001 |

OTHER PUBLICATIONS

"Universal Mobile Telecommunications System (UMTS); Radio Resource Control (RRC) protocol specification" 3GPP TS 25.331 Version 3.9.0 Release 1999, pp. 75, 385.

3G TS 25.331 (v3.3.0), relevant pp. 216 and 217, Jun. 23, 2000.

3GPP TS 27.007 (v4.0.0). 3rd Generation Partnership Project; Technical Specification Group Terminals; AT Command Set For User Equipment (UE) (Release 4), 2000.

* cited by examiner

CONFIGURING COMPRESSION IN PACKET-SWITCHED DATA TRANSMISSON

BACKGROUND OF THE INVENTION

The invention relates to the configuration of the use of compression in packet-switched data transmission.

Third-generation mobile systems, called at least UMTS (Universal Mobile Telecommunication System) and IMT-2000 (International Mobile Telephone System), will provide not only circuit-switched, typically speech services, but also packet-switched services for instance in the manner of the packet radio network GPRS (General Packet Radio Service) designed for the GSM system. Packet-switched data transmission enables the use of different data services by means of a mobile station and, on the other hand, the allocation of the resources of a mobile system, especially the radio interface, to each user as is necessary.

When a packet-switched connection is used, the radio resource management RRM system of the UMTS system allocates parameters to a radio bearer, the parameters specifying the properties of the radio bearer used. One of the parameters specifying a radio bearer is the method of compressing the header fields of the data packets used by the terminal. In the UMTS system, header fields are compressed in data packets to be transmitted and decompressed in data packets to be received on a packet data convergence protocol layer PDCP belonging to the packet data protocol. Several header field compression methods supported by a terminal are typically configured for it. In the present development versions of the UMTS system, the header field compression method to be used on a radio bearer is configured in such a way that before a connection is set up, the terminal informs the radio access network RAN of the compression methods supported by the terminal. The RAN uses this information to decide whether header field compression is to be used on the packet-switched connections of said terminal, and which compression method is used.

The problem in the above arrangement is that the user of a terminal has no effect on whether or not header field compression is used on packet-switched connections. Header field compression is often preferable, since it allows the limited radio resources to be used more efficiently to transfer payload. However, situations and applications exist wherein header field compression is not preferable, such as when the limited processing capacity of a terminal is to be saved or if the compatibility of applications requires this on a radio bearer. In the UMTS system, the user of a terminal cannot configure header field compression so as to be suitable for each particular situation, but, instead, the configurations set by the RAN are used on all data links, i.e. PDP contexts (Packet Data Protocol Context) of the terminal.

A method of configuring compression methods for header fields (PCOMP, Protocol control information Compression, also known as HCOMP, Header Compression) and user data (DCOMP, Data Compression) is known from the GSM-based GPRS system, wherein a header field and user data compression method is negotiated for each PDP context upon activation of the PDP context by means of a context identifier CID field. This allows the user of the terminal to influence the compression parameters to be used and whether compression is to be used at all. However, such a negotiation mechanism does not exist in the UMTS system. This is why a suitable way to offer the user of a terminal a chance to influence the configuration of compression methods has to be found for the UMTS system.

BRIEF DESCRIPTION OF THE INVENTION

The object of the invention is thus to provide a method and an equipment implementing the method so as to offer the user of a terminal a chance to influence the configuration of compression methods. The objects of the invention are achieved by a method and a mobile station, which are characterized in what is stated in the independent claims. The preferred embodiments of the invention are disclosed in the dependent claims.

The invention is based on the idea of offering the user of a mobile station a chance to influence the use of a compression method by modifying the characteristics parameters of the mobile station, particularly the parameters specifying the compression methods used, whereby the characteristics parameters to be communicated to the radio network are changed in accordance with the settings made by the user. In response to a change, the mobile station is arranged to transmit the modified characteristics parameters to the radio network, which then configures a compression method to be used or not to be used on all radio bearers of the mobile station in accordance with the settings made by the user.

The method and mobile station of the invention provide the advantage that they offer the user of a terminal a chance to influence the configuration of the compression methods used. Another advantage is that the invention can be preferably implemented as an internal change in the mobile station, whereby no changes are preferably needed in the mobile system, its network elements or the data transmission used in the system. A further advantage is that the changes made by the user of the terminal in the characteristics parameters are not critical to time, but the user may make the changes either before the activation of a PDP context(s) or after at least one PDP text is activated.

BRIEF DESCRIPTION OF THE FIGURES

In the following, the invention will be described in detail in connection with preferred embodiments with reference to the accompanying drawings, in which.

DETAILED DESCRIPTION OF THE INVENTION

In the following, the invention will be described by way of example in connection with packet radio service according to the UMTS system, to which system the invention is particularly suitable. However, the invention is not limited only to the UMTS system, but it can be applied to any packet-switched data transmission system, in which the user of a terminal would find it useful to influence the header field and/or user data compression method used.

Figure 1:
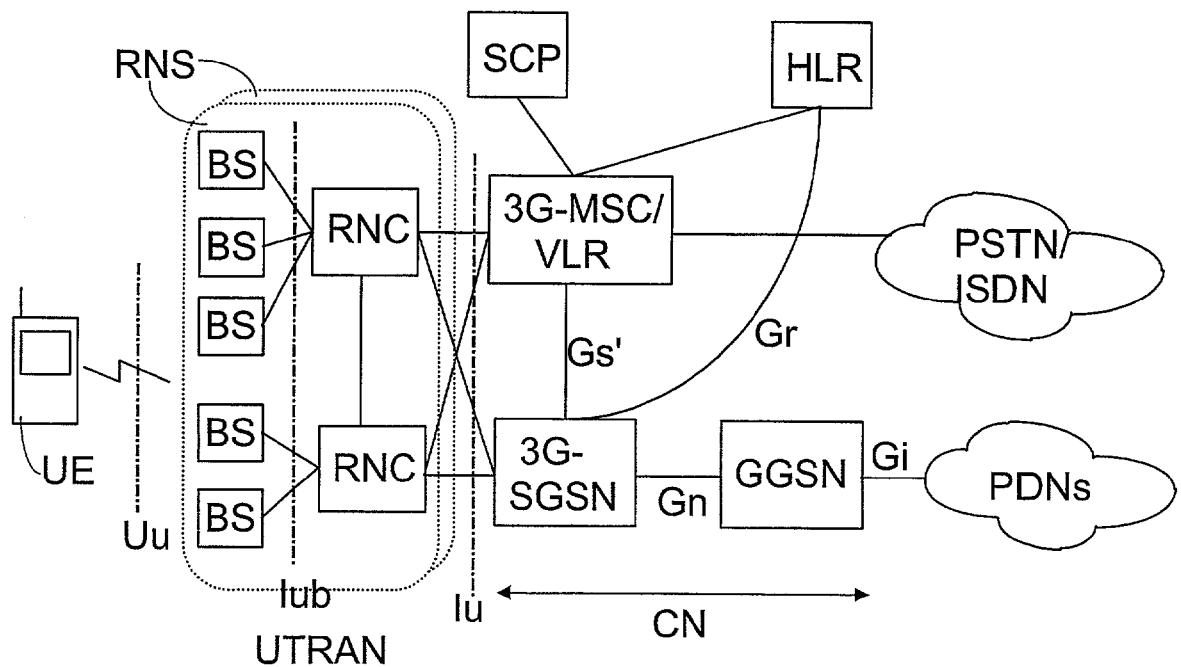
FIG. 1 is a block diagram of the structure of the UMTS system.

The structure of the UMTS mobile system will be described with reference to FIG. 1. FIG. 1 comprises only the blocks relevant to explaining the invention, but it is apparent to a person skilled in the art that a conventional mobile system also comprises other functions and structures that need not be explained in detail herein. The main components of a mobile system are a core network CN and a UMTS terrestrial radio access network UTRAN, which constitute the fixed network of the mobile system, and a mobile station or user equipment UE. The interface between the CN and the UTRAN is called Iu, and the air interface between the UTRAN and the UE is called Uu.

The UTRAN typically comprises a plurality of radio network subsystems RNS, the interface between which is called Iur (not shown). The RNS is composed of a radio network controller RNC and one or more base stations BS, which are also called nodes B. The interface between the RNC and the BS is called Iub. The BS typically implements the radio path and the RNC manages at least the following: radio resources, control of inter-cell handover, power adjustment, timing and synchronization, paging terminals.

The CN is composed of an infrastructure that is external to the UTRAN and belongs to a mobile system. In the CN, a mobile switching centre/visitor location register 3G-MSC/VLR communicates with a home location register HLR and preferably also with an intelligent network service control point SCP. The HLR and the VLR comprise information on mobile subscribers: the HLR comprises information on all subscribers of the mobile network and the services ordered by them, and the VLR comprises information on the mobile stations roaming the area of a given MSC. A connection to a serving GPRS support node 3G-SGSN is established via an interface Gs', and to the fixed telephone network PSTN/ISDN via a gateway MSC (GMSC, not shown). A connection from the 3G-SGSN is established to external data networks PDN via an interface Gn to a gateway GPRS support node GGSN, from which a connection exists to external data networks PDN. The connection of both the 3G-MSC/VLR and the 3G-SGSN to the UTRAN (UMTS Terrestrial Radio Access Network) is via the interface Iu. It is to be noted that the UMTS system is designed such that the CN can be identical to for example the core network of the GSM system, whereby there is no need to rebuild the entire network infrastructure.

The UMTS system thus also comprises a packet radio system, which is mainly implemented in accordance with a GPRS system connected to the GSM network, which explains the references to the GPRS system in the names of the network elements. The UMTS packet radio system may comprise several gateway and operating nodes, and typically several operating nodes 3G-SGSN are connected to one gateway node 3G-GGSN. Both nodes 3G-SGSN and 3G-GGSN operate as routers that support the mobility of a mobile station and attend to the control of the mobile system and route data packets to mobile stations irrespective of their location or the protocol used. The 3G-SGSN communicates with a mobile station MS via the UTRAN. The 3G-SGSN serves to detect mobile stations capable of packet radio connections within its service area, to transmit and receive data packets from said mobile stations and to monitor the location of the mobile stations within its service area. The 3G-SGSN also communicates with the 3G-MSC and the VLR via the signalling interface Gs' and with the HLR via an interface Gr. Records associated with packet radio service and comprising the contents of subscriber-specific packet data protocols are also stored in the HLR.

The 3G-GGSN serves as a gateway between the packet radio system of the UMTS network and the external packet data network PDN. External data networks include for example another network operator's UMTS or GPRS network, the Internet, an X.25 network or a private local area network. The 3G-GGSN communicates with these data networks via an interface Gi. Data packets to be transferred between the 3G-GGSN and the 3G-SGSN are always encapsulated in accordance with a gateway tunnelling protocol GTP. The 3G-GGSN also comprises the PDP addresses and routing information of mobile stations, i.e. 3G-SGSN addresses. Routing information is thus used to link data packets between an external data network and the 3GSGSN. The network between the 3G-GGSN and the 3G-SGSN is a network utilizing an IP protocol, preferably IPv6 (Internet Protocol, version 6).

Figure 2A:
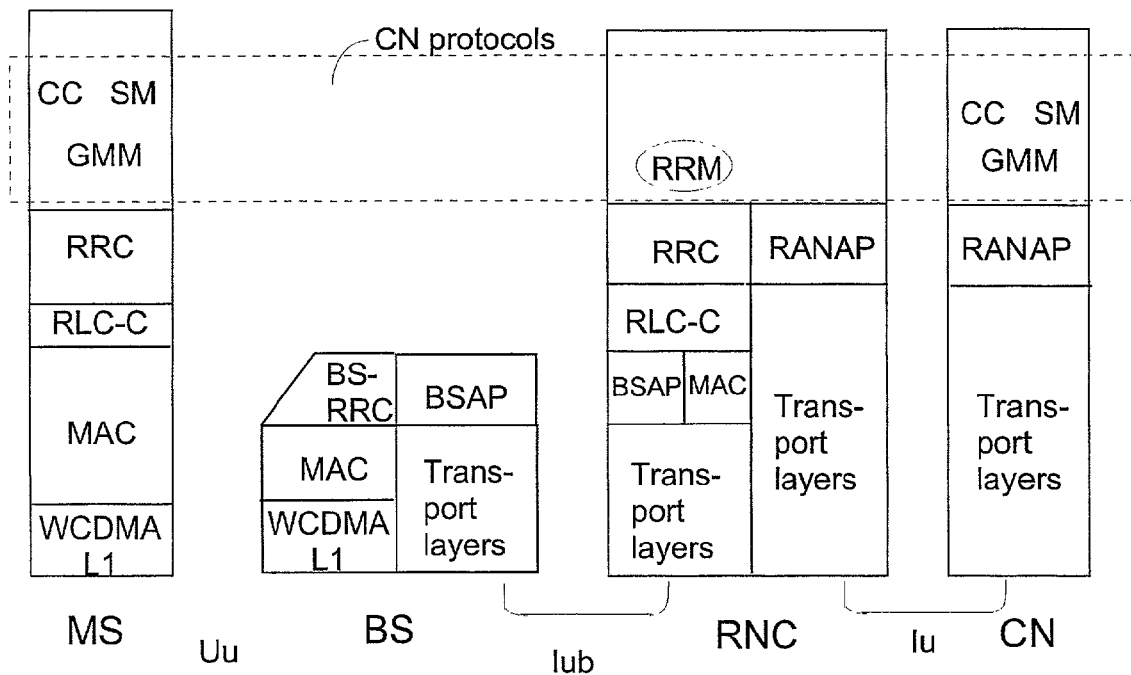
FIGS. 2a and 2b show protocol stacks used for UMTS control signalling and transmission of user data.
Figure 2B:
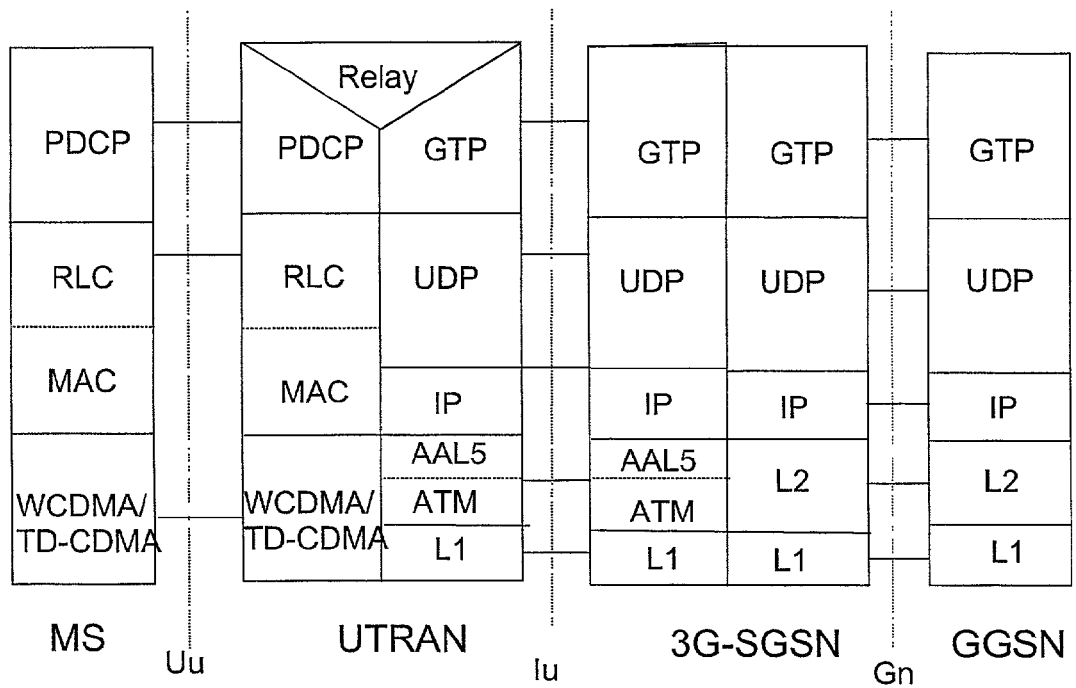

FIGS. 2a and 2b show UMTS protocol stacks for control plane signalling and transmission of user plane data in the packet radio service of the UMTS system. FIG. 2a shows the protocol stack used for control signalling between an MS and the CN. The GPRS mobility management GMM, call control CC and session management SM of an MS are signalled on the upper protocol layers between the MS and the CN such that base stations BS and the RNC between them are transparent to this signalling. A radio resource management RRM system controls radio resource management on a radio bearer between an MS and the base stations BS and transfers control information from the RNC to the base stations BS. These functionalities associated with the general management of a mobile system form a group called core network CN protocols, also known as Non-Access Stratum. Correspondingly, the signalling associated with controlling the radio network between an MS, a BS and the RNC is carried out on protocol layers commonly called radio network RAN protocols, i.e. Access Stratum. These include lower level transfer protocols, the control signalling transferred by which is transferred to upper layers for further processing. The most essential of the upper Access Stratum layers is the radio resource control RRC protocol, which attends to establishing, configuring, maintaining and releasing radio connections between an MS and the UTRAN, and to transferring control information from the CN and the RAN to the mobile stations MS. The RRC also attends to reserving sufficient capacity for a radio bearer in accordance with instructions from the RRM.

The protocol stack shown in FIG. 2b is used in the transmission of packet-switched user data in the UMTS. Lower level data transfer on the physical layer at the interface Uu between the UTRAN and an MS is carried out in accordance with the WCDMA or the TD-CDMA protocol. A MAC layer above the physical layer transfers data packets between the physical layer and an RLC layer, and the RLC layer is responsible for the logical management of the radio links of different radio bearers. The functionalities of the RLC include for example segmenting user data to be transmitted (RLC-SDU) into one or more RLC data packets RLC-PDU. The header fields of the data packets (PDCP-PDU) of the PDCP layer above the RLC can be optionally compressed. The PDCP-PDUs are then handed over to the RLC and they correspond to one RLC-SDU. User data and the RLC-SDUs are segmented and then transferred in RLC frames, to which address and control information relevant to data transmission is added. The RLC layer also attends to the retransmission of damaged frames. The 3G-SGSN attends to routing data packets coming from an MS via the RAN further to the right 3G-GGSN. The tunnelling protocol GTP is used on this connection and it encapsulates and tunnels all user data and signalling to be transferred via the core network. The GTP protocol is run above the IP used by the core network.

Figure 3:
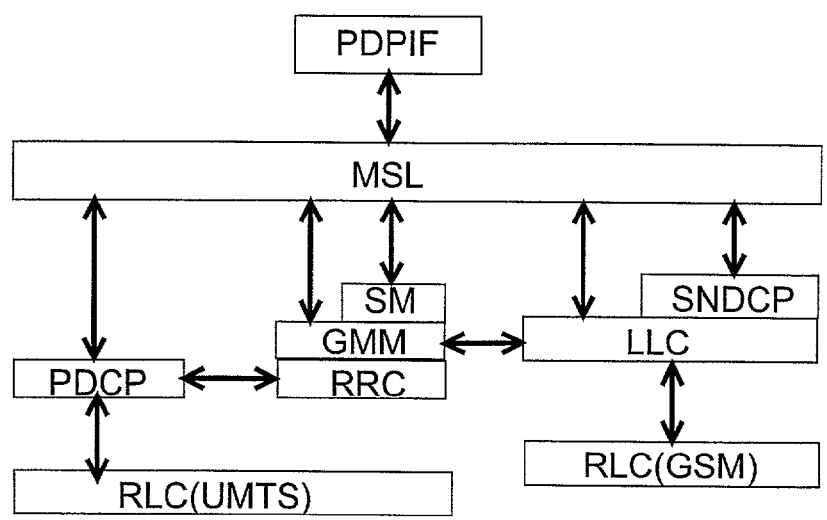
FIG. 3 shows an embodiment for a dual-mode mobile station by means of protocol stacks.

FIG. 3 shows, by means of protocol layers, an embodiment for a dual-mode mobile station usable in both the UMTS and GSM/GPRS systems. The UMTS partition comprises the above-described RLC and PDCP layer functionalities, both of which are controlled by the RRC. mobile station also comprises the above-described protocols GMM and SM for managing the mobility and the radio bearers of the mobile station. A connection is arranged from these three control protocols, preferably via the GMM layer, to a GSM/GPRS partition comprising an RLC layer corresponding to the UMTS radio link layer and LLC (Logical Link Layer) and SNDCP (SubNetwork Dependent Convergence Protocol) layers, which together correspond to the PDCP.

dual-mode mobile station also comprises layers MSL (Multi System Link) and PDPIF (Packet Data Protocol Interface), common to both the UMTS and the GSM/GPRS partitions. The MSL layer attends to adapting inter-system (UMTS and GSM/GPRS) functions, particularly inter-system handover. The tasks of the MSL layer include for example routing data packets to the right convergence protocol layers and local generation of PDP contexts on convergence protocol layers. The PDPIF layer constitutes an interface and an end point for an internal link in the mobile station for establishing a connection for an application in the mobile station or in a data terminal connected thereto, the data comprised by which application is to be transmitted on a packet-switched UMTS/GPRS connection. The PDPIF layer adapts the protocols used on this internal link to UMTS/GPRS-specific protocols and functionalities. In addition, UMTS/GPRS-specific settings are often stored in the PDPIF layer, such as default-value quality of service QoS parameters. The user of the mobile station is preferably able to modify the default-value settings of these different parameters by an application comprised by the mobile station. Both the MSL and the PDPIF layers can be implemented in the mobile station separately by each manufacturer, whereas UMTS and GSM standards regulate the implementation and function of the other layers described above.

When a GPRS-based connection is set up with a dual-mode mobile station described above, the header field compression method is typically negotiated in connection with the activation of a PDP context. PDP context configuration comprises a plurality of parameters that have to be negotiated before the PDP context is activated. One of these parameters is the PCOMP (sometimes also referred as HCOMP) parameter specifying the taking into use of the header field compression method. A compression method is configured for each PDP context separately in such a way that the PCOMP parameter is given the value zero when no compression is used and the value one if compression is used. If compression is used, then the PCOMP parameter also includes a definition of the compression method. The user of a terminal is preferably able to specify if compression is used on the PDP context generated at each particular time and the value that the terminal sets for the PCOMP parameter.

A GPRS terminal is preferably able to support several header field compression methods. In this case the compression method can be configured such that a default-value configuration of the header field compression method is stored in the terminal, preferably in the PDPIF layer, and the default method is used if the user of the terminal sets no other configurations. However, the user of the terminal is able to set another header field compression method to be used for a PDP context, and in this case the default method is not used. The user of the terminal is also able to configure another header field compression method as the default compression method, and it is stored in place of the original default configuration.

However, the above method of configuring a PDP context-specific header field compression method is not in use in the UMTS system, instead, the compression method to be used is configured for each PDP context of an UMTS terminal such that the terminal transmits a UE_capability message to the UTRAN, the message including the functionalities of the terminal and comprising information on e.g. the header field compression methods supported by the terminal, and the UTRAN makes a decision for each radio bearer and, therefore, also for each PDP context, whether header field compression is used, and which compression method is used. In the UTRAN, the RRC thus constitutes a functional entity, which configures the use of a compression method for radio bearers, preferably on the basis of instructions from the RRM. Consequently, in accordance with prior art, the user of a UMTS terminal is unable to influence if compression is used nor to configure the compression method to be used.

In accordance with FIG. 3, the UMTS partition and the GSM/GPRS partition of a dual-mode mobile station use the same PDPIF layer. Default value settings for different parameters (e.g. the value of the PCOMP parameter and the compression method to be used) are stored in this PDPIF layer, and the user of the mobile station is preferably able to modify these settings using an application comprised by the mobile station. Thus it is irrelevant with respect to these parameter settings if the mobile station uses an UMTS- or GSM/GPRS-based connection. However, on an UMTS-based connection, the user of the mobile station is unable to set a compression method to be in use or out of use, although the user is able to modify said parameter settings.

In accordance with the invention, this limitation can be preferably avoided. Since in the UMTS system, the UE_capability parameters, which configure the functionalities of the terminal, are used to configure the compression method for all PDP contexts and radio bearers of a mobile station in the UTRAN, the user of a mobile station can be provided, in accordance with the invention, with a chance to influence the use of a compression method by modifying said UE_capability parameters, particularly the PCOMP parameter and the compression method to be used. Thus, in accordance with the invention, the UE_capability settings of a mobile station are arranged modifiable in accordance with the settings configured by the user, and in response to this change the mobile station is arranged to transmit the modified UE_capability parameters to the UTRAN, particularly to the RRC. The UTRAN then configures a compression method for use or out of use for all radio bearers in accordance with the settings configured by the user of the mobile station.

The invention is preferably implemented as an internal modification in the mobile station such that the PDPIF layer is arranged to notify the changes in the settings made by the user to the PCOMP parameter and the compression method used immediately to the RRC, which, in turn, is arranged to make the corresponding changes in the UE_capability settings of the mobile station and to transmit the new UE capability parameters to the UTRAN. In other words, the modifications made to implement the invention do not preferably require any modifications in the UMTS system, its network elements or the data transmission used in the system. Furthermore, the changes made by the user in the UE_capability parameters, particularly the PCOMP parameter and the compression method used, are preferably not critical to time, but the user may make the changes either before the activation of a PDP context(s) or after at least one PDP text is activated. The specifications made by the user in respect of the compression method, i.e. the new UE_capability parameters transmitted to the UTRAN, are preferably taken into use at the latest when the parameters of the radio bearer are modified next.

Figure 4A:
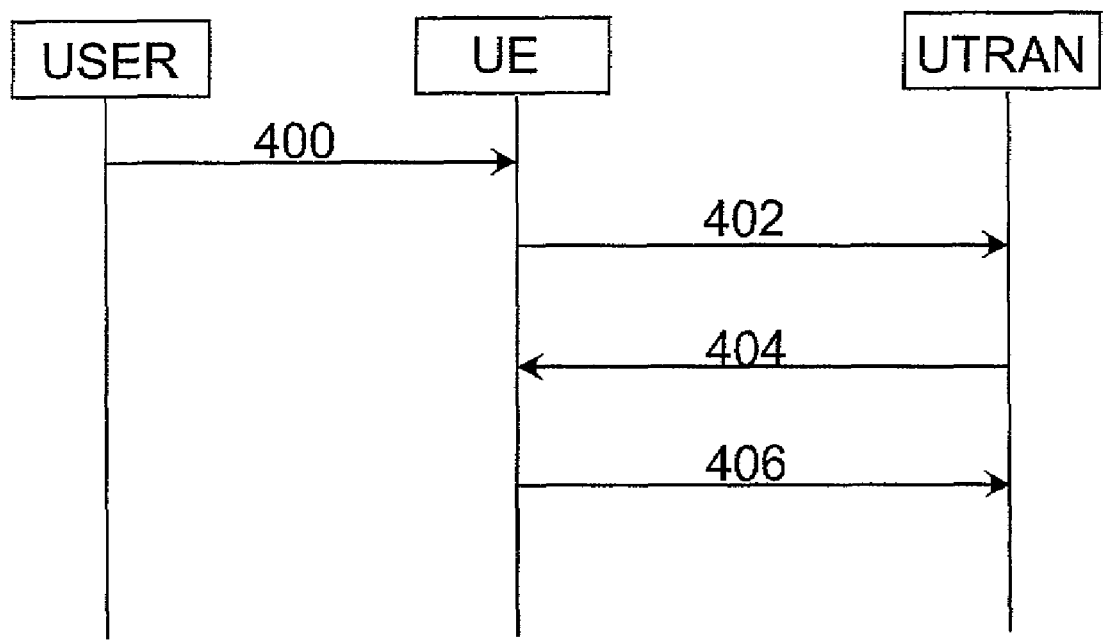
FIGS. 4a and 4b are signalling diagrams of the configuration of compression according to some preferred embodiments of the invention.
Figure 4B:
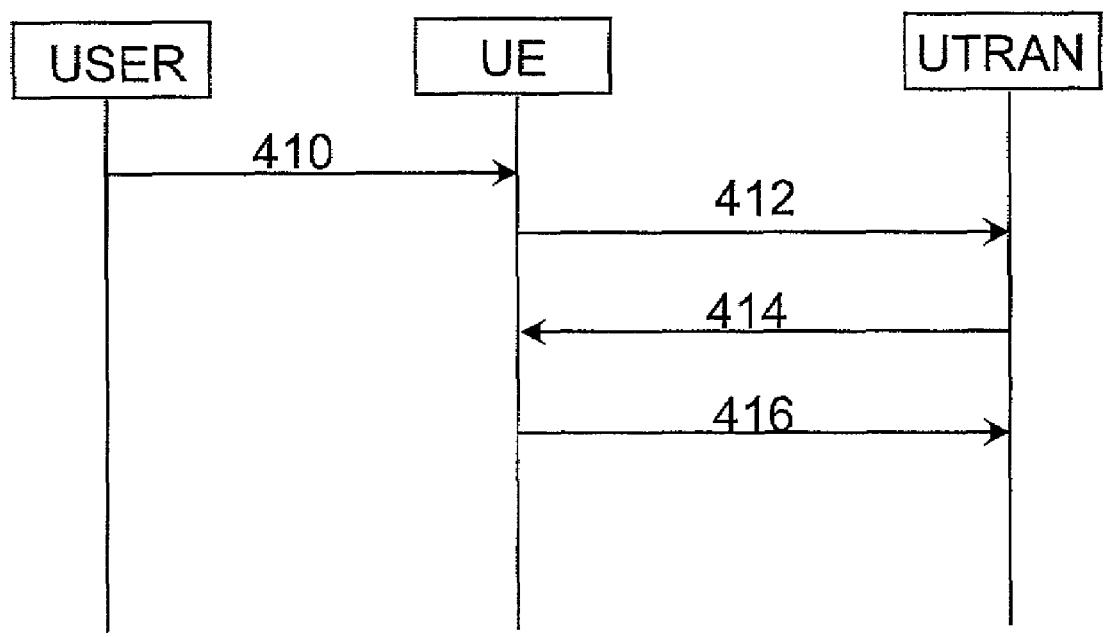

FIGS. 4a and 4b illustrate the method of the invention by showing signalling according to some embodiments in situations when the user of a mobile station sets compression on (4a) and, correspondingly, off (4b). In FIG. 4a, the USER of a mobile station modifies the PCOMP parameter and the compression method to be used, stored in the PDPIF layer using an application comprised by the mobile station UE. The USER selects the compression method to be used and sets it into use with the PCOMP parameter (400). The PDPIF layer informs the changes in the settings made by the user to the RRC, which makes the corresponding changes in the UE_capability settings of the mobile station. The new UE_capability parameters are transmitted to the UTRAN, particularly to the RRC of the RNC, in a UE_capability_information message (402). The RNC sets the compression method to be used on the radio bearer in accordance with the new properties configured by the user of the UE, and informs the settings of the radio bearer to the mobile station in a Radio_bearer_setup message or a Radio_bearer_reconfiguration message (404). The UE acknowledges the reception of the settings with an RB_setup_complete message or, correspondingly, an RB_reconfiguration_complete message (406).

Correspondingly, in FIG. 4b the USER of a mobile station modifies the PCOMP parameter and the compression method used, stored in the PDPIF layer using an application comprised by the UE such that the compression method is set to be out of use by means of the PCOMP parameter (410). The PDPIF again informs the changes in the settings made by the user to the RRC, which makes the corresponding changes in the UE_capability settings of the mobile station. The new UE_capability parameters are transmitted to the RRC of the RNC in an UE_capability_information message (412). The RNC sets the compression method to be out of use on the radio bearer in accordance with the mobile station characteristics configured by the user, and informs the radio bearer settings to the mobile station in a Radio_bearer_setup message or a Radio_bearer_reconfiguration message (414). The UE, in turn, acknowledges the reception of the settings in an RB_setup_complete message or an RB_reconfiguration_complete message (416). A more detailed specification of the UE_capability_information message can be found for example in 3GPP specification TS 25.331, paragraph 10 (v. 3.3.0).

The above-described modifications made by the user of a mobile station to the parameters used can be preferably implemented from a user interface of the mobile station or a data terminal connected thereto, preferably by means of an application arranged for this purpose. Several different commands for controlling mobile stations supporting packet-switched services are specified for modifying the radio bearer parameters to be used. A more detailed specification of these commands is found for example in 3GPP specification TS 27.007, paragraph 10.1. (v. 4.0.0). Furthermore, said parameter modifications can be carried out by means of AT commands, which are simple commands typically used for controlling modem connections. AT commands have the advantage that they can be used with simple terminals, and, at the same time, the typically allow the compatibility with older applications to be ascertained. The use of AT commands in making parameter modifications is described for example in 3GPP specification TS 27.007, paragraph 10.2. (v. 4.0.0).

The invention was described above particularly with respect to setting header field compression in the UMTS system. Although the present development versions of the UMTS system do not yet allow the configuration of the compression of user data, in contrast to what the GPRS system does, later development versions of the UMTS may comprise this feature. The invention is therefore not limited to setting header field compression (PCOMP), but it may be utilized also for example in specifying user data compression (DCOMP). Thus, the compression parameters, which can be specified by the user, can be referred to as user compression preference. Furthermore, the invention is not limited only to the UMTS system, but it may be applied to any packet-switched data transmission system, wherein the user of a terminal should be able to influence the header field and/or user data compression method used.

It is apparent to a person skilled in the art that, as technology advances, the basic idea of the invention may be implemented in various ways. The invention and its embodiments are thus not restricted to the above examples, but may vary within the scope of the claims.

What is claimed is:

1. A method comprising:
configuring a plurality of compression methods in a terminal communicating with a packet-switched mobile system, wherein characteristics parameters are specified for a terminal, the characteristic parameters comprising at least one of the compression methods supported by the terminal, and wherein a functional entity is configured in a radio network for configuring the compression method to a radio bearer, the method further comprising:
configuring at least one of the compression methods in the system on simultaneous radio bearers of the terminal in said functional entity on the basis of the characteristics parameters transmitted by the terminal,
allowing a user of the terminal to update the parameters specifying the compression methods of the terminal in the terminal,
modifying the characteristics parameters of the terminal in accordance with said update,
transmitting the modified characteristics parameters to said functional entity comprised by the radio network, and
configuring the use of a compression method for each simultaneous radio bearer on the basis of the modified characteristics parameters; and wherein
the packet-switched mobile system is the UMTS system and the functional entity of the radio network for specifying the compression method for a radio bearer comprising a radio resource control protocol and a message specifying the characteristics parameters is a UE capability information message comprising at least a selection parameter for the header field compression method for data packets supported by a convergence protocol of the terminal.

2. A method as claimed in claim 1, further comprising transmitting the modified characteristics parameters to said functional entity comprised by the radio network before a radio bearer is established.

3. A method as claimed in claim 1, further comprising:
transmitting the modified characteristics parameters to said functional entity comprised by the radio network during an established radio bearer, and
reconfiguring the use of the compression methods of the simultaneous radio bearers of the terminal on the basis of the modified characteristics parameters without releasing the radio bearers.

4. A method comprising:

configuring a plurality of compression methods in a terminal communicating with a packet-switched mobile system, wherein characteristics parameters are specified for a terminal, the characteristic parameters comprising at least one of the compression methods supported by the terminal, and wherein a functional entity is configured in a radio network for configuring the compression method to a radio bearer, the method further comprising:

configuring at least one of the compression methods in the system on simultaneous radio bearers of the terminal in said functional entity on the basis of the characteristics parameters transmitted by the terminal, allowing a user of the terminal to update the parameters specifying the compression methods of the terminal in the terminal, modifying the characteristics parameters of the terminal in accordance with said undate, transmitting the modified characteristics parameters to said functional entity comprised by the radio network, and configuring the use of a compression method for each simultaneous radio bearer on the basis of the modified characteristics parameters; and wherein the packet-switched mobile system is the UMTS system and the functional entity of the radio network for specifying the compression method for a radio bearer comprising a radio resource control protocol and a message specifying the characteristics parameters is an UE_capability_information message comprising at least a selection parameter for the user data compression method for data packets supported by a convergence protocol of the terminal.

5. A terminal of a mobile communication system, the terminal comprising:

means for allowing a user of the terminal to update parameters specifying at least one of a plurality of compression methods of the terminal in the terminal and for which terminal characteristics parameters are specified that comprise at least one of the compression methods supported by the terminal, the terminal being configured to:

modify the characteristics parameters of the terminal in accordance with said update, transmit the modified characteristics parameters to the radio network of the mobile communication system, and receive from the radio network the settings of the use of a compression method on each simultaneous radio bearer of the terminal specified on the basis of said modified characteristics parameters, and wherein the terminal is a terminal supporting at least the UMTS system, and a message specifying the characteristics parameters to the radio network being an UE capability information message comprising at least a selection parameter for the header field compression method for data packets supported by a convergence protocol of the terminal.

6. A terminal as claimed in claim 5, wherein the terminal is arranged to transmit the modified characteristics parameters to the radio network before the radio bearer is established.

7. A terminal as claimed in claim 5, wherein the terminal is arranged to:

transmit the modified characteristics parameters to the radio network during an established radio bearer, receive new settings for the use of the compression method specified in the radio network on the basis of the modified characteristics parameters, and reconfigure the settings of the use of the compression methods of the simultaneous radio bearers of the terminal without releasing the radio bearers.

* * * * *